US009535230B2

(12) United States Patent  
Newbury et al.

(10) Patent No.: US 9,535,230 B2
(45) Date of Patent: Jan. 3, 2017

(54) INTEGRATED FIBER OPTIC CABLE FAN-OUT CONNECTOR

(71) Applicant: SENKO ADVANCED COMPONENTS, INC., Marborough, MA (US)

(72) Inventors: Paul Newbury, Ashland, MA (US); Jimmy Chang, Worcester, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 46 days.

(21) Appl. No.: 14/170,265

(22) Filed: Jan. 31, 2014

(65) Prior Publication Data
US 2015/0260936 A1  Sep. 17, 2015

(51) Int. Cl.
G02B 6/44 (2006.01)
G02B 6/46 (2006.01)

(52) U.S. Cl.
CPC .............. G02B 6/4471 (2013.01); G02B 6/46 (2013.01); G02B 6/4416 (2013.01); G02B 6/4466 (2013.01); Y10T 29/49826 (2015.01); Y10T 29/49908 (2015.01)

(58) Field of Classification Search
CPC ....... G02B 6/4471; G02B 6/46; G02B 6/4416; G02B 6/4466; Y10T 29/49826; Y10T 29/49908
See application file for complete search history.

(56) References Cited

U.S. PATENT DOCUMENTS

| 4,150,790 A | 4/1979 | Potter |
| 4,327,964 A | 5/1982 | Haesly et al. |
| 4,762,388 A | 8/1988 | Tanaka et al. |
| 4,764,129 A | 8/1988 | Jones et al. |
| 4,840,451 A | 6/1989 | Sampson et al. |
| 4,872,736 A | 10/1989 | Myers et al. |
| 5,076,656 A * | 12/1991 | Briggs ................. G02B 6/3807 385/60 |
| D323,143 S | 1/1992 | Ohkura et al. |
| 5,212,752 A | 5/1993 | Stephenson et al. |
| 5,317,663 A | 5/1994 | Beard et al. |
| 5,348,487 A | 9/1994 | Marazzi et al. |
| 5,367,595 A * | 11/1994 | Jennings .............. G02B 6/2804 385/59 |
| 5,402,512 A * | 3/1995 | Jennings .............. G02B 6/2804 385/114 |
| 5,444,806 A | 8/1995 | deMarchi et al. |
| 5,481,634 A | 1/1996 | Anderson et al. |
| 5,506,922 A | 4/1996 | Grois et al. |

(Continued)

FOREIGN PATENT DOCUMENTS

| CA | 2495693 A1 | 4/2004 |
| CN | 2836038 Y | 11/2006 |

(Continued)

OTHER PUBLICATIONS

International Search Report and Written Opinion dated Jun. 25, 2015, from corresponding International Application No. PCT/US15/13089, International Filing Date Jan. 27, 2015.

(Continued)

Primary Examiner — Peter Radkowski
(74) Attorney, Agent, or Firm — Pepper Hamilton LLP

(57) ABSTRACT

An integral fan-out connector assembly for fiber optic cables includes a connector housing that provides an integrated fan-out housing and connection adapter. The fan-out connector housing may be configured with a variety of cable adapters, and may be installed as a 'plug and play' type solution where it will be ready to accept a feed cable for use when needed.

17 Claims, 12 Drawing Sheets

(56) References Cited

U.S. PATENT DOCUMENTS

| | | |
|---|---|---|
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,781,681 A | 7/1998 | Manning et al. |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,461,054 B1 | 10/2002 | Iwase |
| 6,471,412 B1 | 10/2002 | Belenkiy et al. |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,854,894 B1 | 2/2005 | Yunker et al. |
| 6,872,039 B2 | 3/2005 | Baus et al. |
| 6,935,789 B2 | 8/2005 | Gross, III et al. |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,234,877 B2 * | 6/2007 | Sedor ................. G02B 6/3879 385/59 |
| 7,258,493 B2 | 8/2007 | Milette |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmell et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,510,335 B1 | 3/2009 | Su et al. |
| 7,513,695 B1 | 4/2009 | Lin et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| D641,708 S | 7/2011 | Yamauchi |
| 8,186,890 B2 | 5/2012 | Lu |
| 8,192,091 B2 | 6/2012 | Hsu et al. |
| 8,202,009 B2 | 6/2012 | Lin et al. |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,651,749 B2 | 2/2014 | Dainese Junior et al. |
| 8,818,156 B2 * | 8/2014 | Nave ................. G02B 6/4459 385/134 |
| 2002/0181891 A1 * | 12/2002 | Alcock ................. G02B 6/32 385/79 |
| 2003/0053787 A1 | 3/2003 | Lee |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2005/0111796 A1 | 5/2005 | Matasek et al. |
| 2005/0141817 A1 | 6/2005 | Yazaki et al. |
| 2006/0089049 A1 * | 4/2006 | Sedor ................. G02B 6/3879 439/620.21 |
| 2006/0127025 A1 | 6/2006 | Haberman |
| 2006/0269194 A1 | 11/2006 | Luther et al. |
| 2006/0274411 A1 | 12/2006 | Yamauchi |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0172172 A1 | 7/2007 | Theuerkorn et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0253730 A1 | 10/2008 | Cox et al. |
| 2008/0267566 A1 | 10/2008 | Lin et al. |
| 2009/0022457 A1 | 1/2009 | De Jong et al. |
| 2009/0028507 A1 | 1/2009 | Jones et al. |
| 2009/0196555 A1 | 8/2009 | Lin et al. |
| 2009/0214162 A1 | 8/2009 | O'Riorden et al. |
| 2009/0220197 A1 | 9/2009 | Gniadek |
| 2009/0290838 A1 | 11/2009 | Lin et al. |
| 2010/0034502 A1 | 2/2010 | Lu et al. |
| 2010/0092136 A1 | 4/2010 | Nhep |
| 2010/0215331 A1 | 8/2010 | Gonzalez et al. |
| 2010/0247041 A1 | 9/2010 | Szilagyi |
| 2010/0290741 A1 | 11/2010 | Lu et al. |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0177710 A1 | 7/2011 | Tobey |
| 2011/0243514 A1 * | 10/2011 | Nave ................. G02B 6/4459 385/110 |
| 2012/0189260 A1 | 7/2012 | Kowalczyk et al. |
| 2012/0269485 A1 | 10/2012 | Haley et al. |
| 2012/0269509 A1 | 10/2012 | Hultermans |
| 2012/0301080 A1 | 11/2012 | Gniadek |
| 2013/0071067 A1 | 3/2013 | Lin |
| 2013/0084050 A1 | 4/2013 | Vastmans et al. |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0183012 A1 | 7/2013 | Cabanne Lopez et al. |
| 2014/0023322 A1 | 1/2014 | Gniadek |
| 2014/0050446 A1 | 2/2014 | Chang |
| 2014/0133808 A1 | 5/2014 | Hill et al. |
| 2014/0334780 A1 | 11/2014 | Nguyen et al. |
| 2014/0348477 A1 | 11/2014 | Chang |

FOREIGN PATENT DOCUMENTS

| | | |
|---|---|---|
| CN | 201383588 Y | 1/2010 |
| CN | 202600189 U | 12/2013 |
| DE | 202006011910 U1 | 3/2007 |
| DE | 102006019335 A1 | 10/2007 |
| EP | 1072915 A2 | 1/2001 |

(56) References Cited

FOREIGN PATENT DOCUMENTS

| | | |
|---|---|---|
| EP | 1074868 A1 | 7/2001 |
| EP | 1211537 A2 | 6/2002 |
| EP | 1245980 A2 | 10/2002 |
| EP | 1566674 A1 | 8/2005 |
| EP | 2302431 A1 | 3/2011 |
| EP | 2674797 A1 | 12/2013 |
| GB | 2111240 A | 6/1983 |
| JP | 2009/229545 A | 10/2009 |
| JP | 2009/276493 A | 11/2009 |
| TW | 200821653 A | 5/2008 |
| WO | WO 01/79904 A2 | 10/2001 |
| WO | WO 2004/027485 A1 | 4/2004 |
| WO | WO 2008/112986 A1 | 9/2008 |
| WO | WO 2009/135787 A1 | 11/2009 |
| WO | WO 2010/024851 A2 | 3/2010 |
| WO | WO 2012/136702 A1 | 10/2012 |
| WO | WO 2012/162385 A1 | 11/2012 |
| WO | WO 2013/052070 A1 | 4/2013 |
| WO | WO 2014/028527 A2 | 2/2014 |
| WO | WO 2014/182351 A1 | 11/2014 |

OTHER PUBLICATIONS

European Search Report and Written Opinion dated Mar. 3, 2015 for EP 14187661.
European Search Report and Written Opinion dated Feb. 19, 2015 for EP 14168005.
International Search Report and Written Opinion dated Aug. 29, 2014 for PCT/US2014/041500.
International Search Report and Written Opinion dated May 14, 2014 for PCT/US2014/012137.
International Search Report and Written Opinion dated Aug. 21, 2008 for PCT/US2008/057023.
"Fiber Optic Connectors and Assemblies Catalog" 2009, Huber & Suhner Fiber Optics, Herisau, Switzerland, http://www.google.co.in/url?sa=t&source=web&cd=63&ved=0CCMQFjACODw&url=http%3A%2F%2Fwww.hubersuhner.com%2Fwrite_rtn_binary.pdf%3Fbinaryid%3D8DBC7DE2EB72D315%26binarytype%3D48403DAA363AEB7E&ei=ZvcvTujWH4ntrAfH-dXZCg&usg=AFQjCNE1MdC-4avewRJU6IDVc_WYbr0QQ.
"Fiber Optic Interconnect Solutions, Tactical Fiber Optic Connectors, Cables and Termini" 2006, Glenair, Inc., Glendale, California, http://www.mps-electronics.de/fileadmin/files/MPS-E/Produkte/Katalog/Glenair/KatalogGlenair-LWL1110.pdf.
"Fiber Optic Products Catalog" Nov. 2007, Tyco Electronics Corporation, Harrisburg, Pennsylvania, http://www.ampnetconnect.com/documents/Fiber%20Optics%20Catalog%201107.pdf.
International Search Report and Written Opinion dated Apr. 27, 2012 for PCT/US2011/058799.
International Search Report and Written Opinion dated Aug. 27, 2012 for PCT/US2012/039126.
International Search Report and Written Opinion dated Jan. 16, 2014 for PCT/US2013/54784.
Partial European Search Report dated Sep. 14, 2016, from corresponding European Application No. 15743433.3.

* cited by examiner

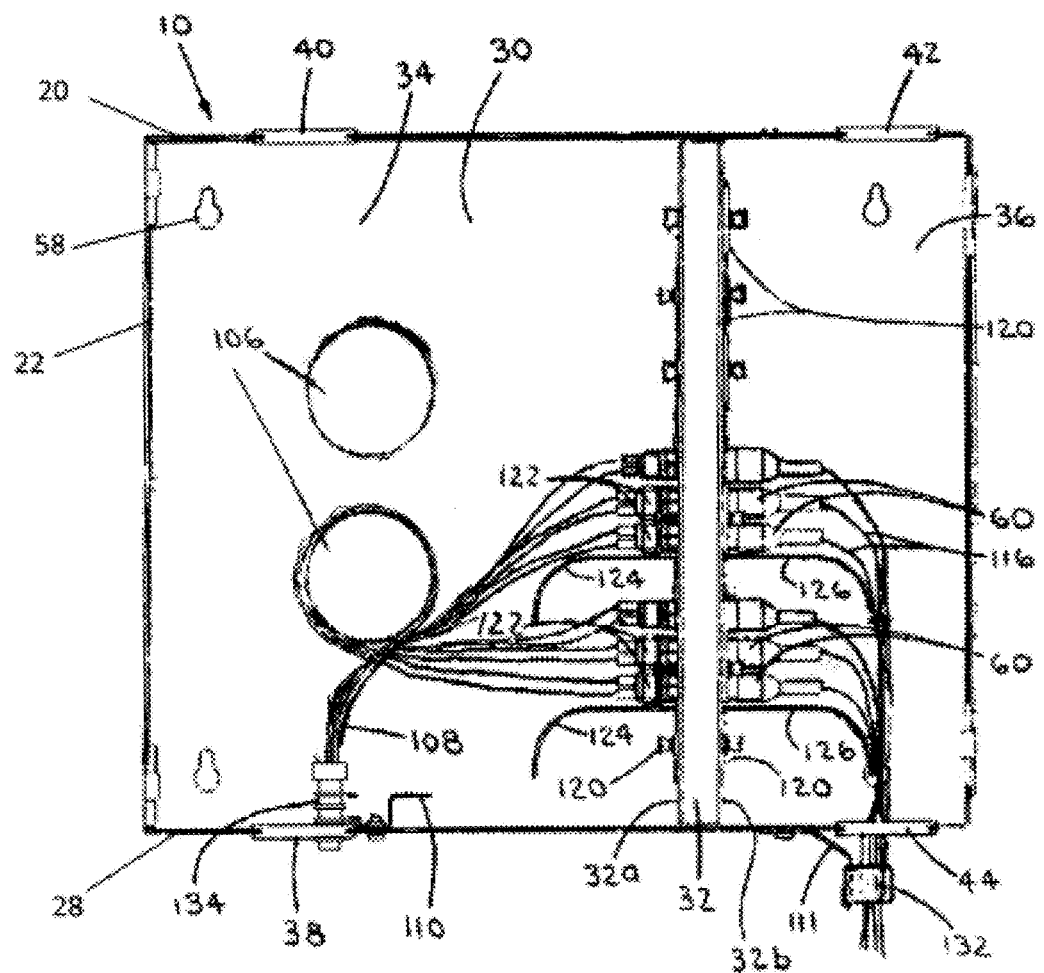

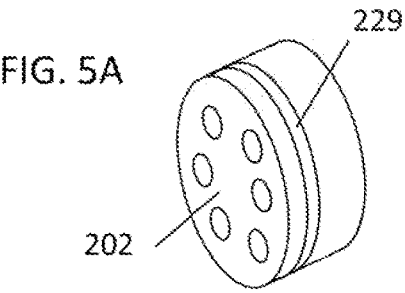
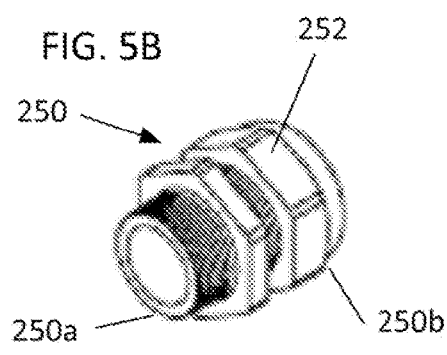
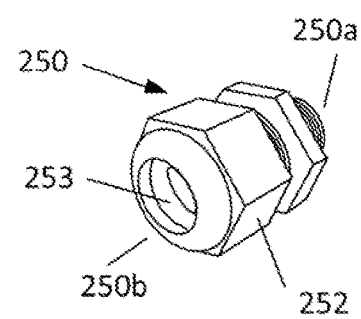
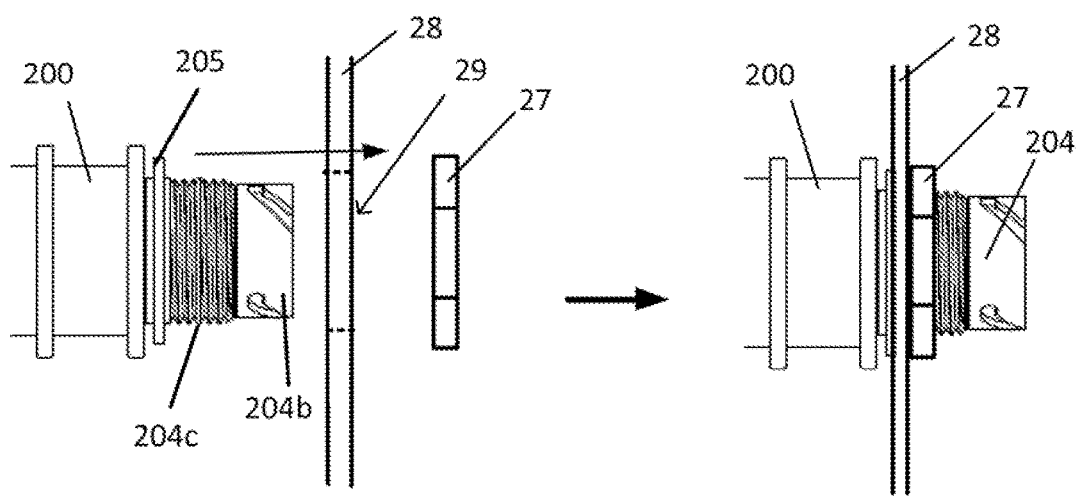

INTEGRATED FIBER OPTIC CABLE FAN-OUT CONNECTOR

BACKGROUND

The use of fiber optics for communications purposes continues to grow. Data, voice, and other communication networks are increasingly using fiber optics to carry information. Conventional fiber optic cables include optical fibers that conduct light in the transmission of voice, video, and data information. Optical cables have the advantages of large bandwidth and low power loss. Typical applications for optical cables include fiber-to-the-curb (FTTC), fiber-to-the-home (FTTH), fiber-to-the-desk (FTTD), fiber-to-the-antenna (FTTA), plenum, riser, local area networks (LANs), and closed circuit television systems (CCTV).

In a fiber optic network, each individual fiber is generally connected to both a source and a destination device. Additionally, along the fiber optic run between the source and the destination, various connections or couplings may be made on the optical fiber to adjust the length of the fiber. Each connection or coupling requires a connector and adapter to align the fibers such that the light can transmit over the connection without interruption.

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramics. A multi-fiber optic cable is terminated in the connector, and a plurality of individual optical fibers of the cable may be terminated in the ferrule. A popular type of fiber optic cable is a multi-fiber flat, or ribbon cable. Since the individual optical fibers of the cable are very closely spaced, a fan-out connector may often be used for receiving, and spreading the individual fibers of the cable so that the fibers are more easily connectorized for individual use. The individual fibers may extend away from the ran-out within a plurality of manipulatable tubes that also protect the fibers.

Fan-out blocks or modules are generally mounted within an enclosure, are wall mounted or bracket mounted, and include a direct feeder cable input that feeds into the housing and provides the individual fibers of the fan-out. The end of the feeder cable may include a fiber optic cable connector for connection to a cable feed, such as a feed in a base station at a distance from the enclosure. A fan-out kit may include terminal fiber connectors, a main feed connector, a fan-out block, and integral fiber optic cables that extend from the feed connector on the one end, to and through the fan-out block and to the individual terminal connectors on the other end. There remains a need for a simplified fan-out system that may be adaptable to a variety of uses.

SUMMARY

An integral fan-out, connector unit allows for the elimination of one of the housing components, as well as, if desired, elimination of a feed cable directly into the housing. The fan-out connector may be configured with a variety of cable adapters, and may be pre-installed for use as a 'plug and play' type solution, where it will be ready for use when needed. Then, at the time when needed, a main feeder cable may be plugged in directly for use. While the fan-out connector housing may be configured for a plug-in feeder cable, the same housing may also be adapted for use with a regular cable gland that allows for direct cable input.

In an embodiment, a fan-out housing for fanning out optical fibers of a multi-fiber source includes a main body defining an interior cavity therein and having a first body portion and a second body portion spaced from the first body portion. The fan-out housing also includes a fan-out member releasable attachable with the first body portion for fanning out optical fibers, and a cable receptacle releasably attachable with the second body portion. The cable receptacle may be either of an optical fiber adapter configured for attachably receiving a connector of a multi-fiber optical cable, or an optical fiber cable gland configured for passage of a multi-fiber optical cable therethrough.

In an embodiment, a fan-out assembly for connecting, fiber optic cables of a multi-fiber optical cable to a plurality of fiber optic terminals includes a housing defining an interior cavity therein, a plurality of pigtail cable segments having a first end disposed within the housing and a free end disposed away from the housing, at least one optical fiber extending through each pigtail cable segment, with each optical fiber including a first end disposed within the interior cavity and a second end disposed at the free end of the pigtail cable segment, a first optical fiber connector collectively terminating the first ends of a plurality of the optical fibers, and at least one second optical fiber connector mounted to the free end of each pigtail cable segment and terminating the second end of the at least one optical fiber of the pigtail cable segment, the second optical fiber connectors being configured to mate with the fiber optic terminals. The housing also includes an optical fiber adapter having a first end open to the interior cavity for receiving the first optical fiber connector therein, and a second end exposed externally of the interior cavity for receiving a connector of a multi-fiber optical cable to mate the optical fibers of the multi-fiber optical cable with the first ends of the optical fibers of the pigtail cable segments.

In an embodiment, a method is provided for connecting remote radio units of a cellular antenna tower with a base transceiver station via a multi-fiber optical cable that includes a terminal connector. The method includes attaching a fiber optic fan-out connector assembly adjacent the remote radio units, the fan-out connector assembly including a housing defining an interior cavity a plurality of pigtail cable segments extending from the housing, with each of the plurality of pigtail cable segments having a first end disposed within the housing and a free end disposed away from the first end, at least one optical fiber extending through each pigtail cable segment and having a first end within the interior cavity and a second end at the free end of the pigtail cable segment, optical fiber connectors mounted to the free ends of each pigtail cable segment and terminating the second end of the at least one optical fiber of the pigtail cable segment. The housing also includes a mating connector for connecting first ends of the optical fibers with the connector of the multi-fiber optical cable, wherein the mating connector includes a plug-in socket for receiving, the connector of the multi-fiber optical cable therein. The method also includes connecting the second optical fiber connectors of the pigtail cable segments to the remote radio units, and connecting, the multi-fiber optical cable from the fan-out connector assembly to the base transceiver station, wherein the connecting includes plugging the connector of the multi-fiber optical cable into the plug-in socket of the mating connector.

BRIEF DESCRIPTION OF THE FIGURES

FIGS. 1A and 1B depict installations of a fan-out connector according to embodiments.

FIGS. 5A-5D depict alternative components of a fan-out connector according to embodiments.

DETAILED DESCRIPTION

Figure 1A:
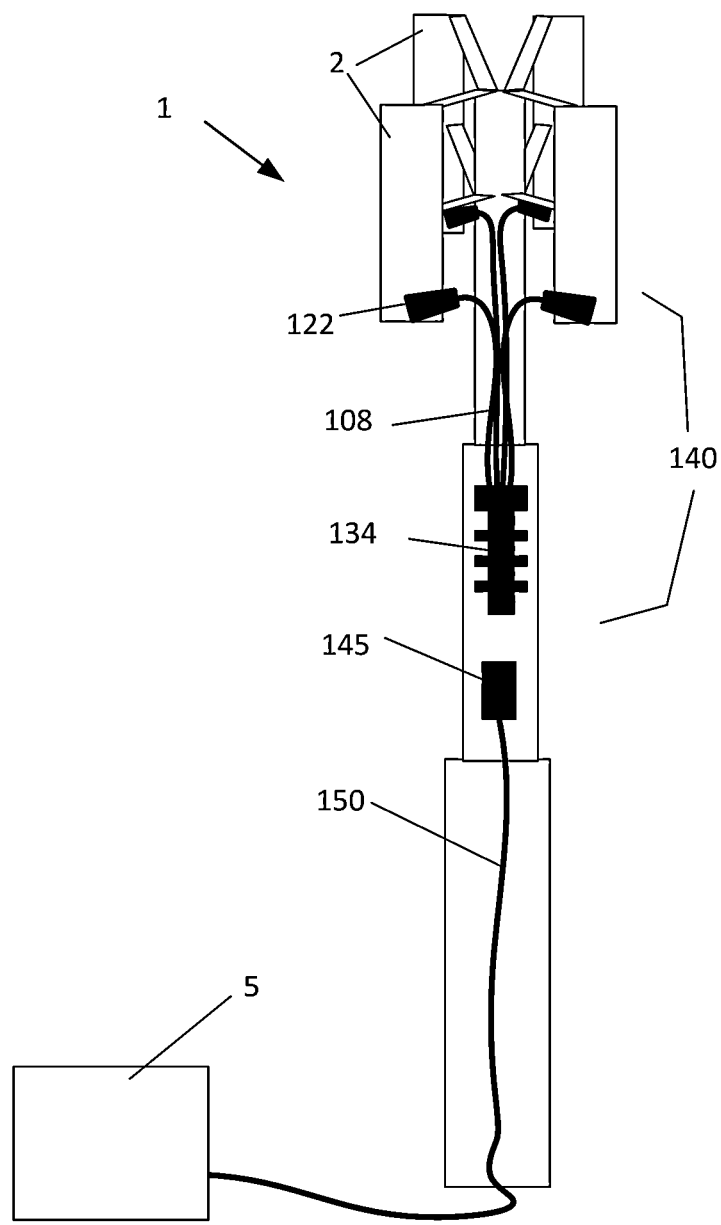

Installations of fiber-to-the-antenna (FTTA) fiber optic systems, such as those that provide wireless phone and internet services, may be simplified by providing plug-and-play type connection assemblies that connect the remote radio units to base transceiver stations. As represented in FIG. 1A, remote radio units 2 may typically be mounted on antenna towers 1, and a base transceiver station 5 may be located near the base of the tower, or a short distance away from the tower. Alternatively, such remote radio units 2 may be mounted on the tops of tall buildings or other tall structures, such as water towers.

As represented in FIG. 1A, but exaggerated in size, a fan-out connector assembly 140 may be installed as a stand-alone distribution system in the vicinity of the remote radio units 2. The assembly 140, as discussed in ore detail below, and shown in greater detail in FIG. 2A, may include a fan-out connector housing 134 having a plurality of fiber optic cables, or pigtails, 108 extending, therefrom. The fan-out connector housing 134 may be fastened in place with a clamping device, such as, for example, a cable tie or hose clamp type securing device. The fiber optic cables 108 may be terminated by fiber optic connectors 122 that are configured to connect with the remote radio units 2. An installed fan-out connector assembly 140 may then be ready for plug-and-play use.

A main feeder cable 150 may be provided between the base station 5 and the installed fan-out connector assembly 140. The distal end of the feeder cable 150 may be terminated with a connector 145 that plugs into the fan-out connector housing 134 to connect individual fiber optic cables in the feeder cable with the fiber optic cables 108. Individual fibers of the feeder cable 150 therefore do not need to be connectorized, providing for an easier installation of the main feeder cable.

In an alternative embodiment, as shown in FIG. 1B, a fan-out connector assembly 140 (housing 134, pigtail cables 108 and connectors 122) may also provide plug-and-play features for a fiber optic wall mount cabinet 10. Cabinet 10 may be a cabinet of, for example, but not limited to, a patch panel, an equipment rack, or a remote radio distribution terminal such as may be mounted on an antenna 1 in the vicinity of the remote radio units 2. A cabinet 10 may have a side wall 22 connected at a first end to a bottom wall 28 and at a second end to a top wall 20. A back wall 30 may be substantially perpendicular to edges of the top wall 20, the side wall 22, and the bottom wall 28 so that the side wall, bottom wall, top wall, and back wall form a substantially rectangular enclosure. The back wall 30 may include mounting features, such as key hole mounting slots 58 configured for allowing fastening of the cabinet 10 to a wall surface.

The cabinet may also have a patch panel wall 32 located within the cabinet for connecting fiber optic cable 108, 116. Such a patch panel wall 32 may extend between the top wall 20 and the bottom wall 28 and substantially parallel to the side wall 22. The patch panel wall 32 may divide the interior of the cabinet 10 into an incoming chamber 34 and an outgoing chamber 36, thereby creating two surfaces, a first incoming surface 32*a* and a second exiting surface 32*b*. The cabinet 10 may have an arrangement of knock-outs or slots 38, 40, 42, 44 in the top wall 20 and the bottom wall 28 for routing fiber optic cable into the incoming chamber 34 and out of exiting chamber 36. On the incoming side (chamber 34), fiber optic cables 108 may extend from a fan-out connector 134, as discussed further below, at knock-outs 38 to the incoming surface 32*a*. On the outgoing side (chamber 36) fiber optic cables 116, terminated on exiting surface 32*b*, may be routed out of the cabinet 10 through slot 44 to active equipment, such as a server.

The cabinet 10 may also be provided with slack management spools 106 that allow for spooling extra incoming cables 108 while maintaining a minimum bend radius in the cables. Further, strain relief brackets 110, 111 may be provided along with any anchor ties 132 for bundling of any fiber optical cable 108, 116 that may enter or exit each chamber. Other arrangements of the parts of the cabinet 10, such as the cable slots and patch panel wall are also possible.

The fiber optic wall mount cabinet 10 may also include lockable covers (not shown) to cover the incoming chamber 34 and exiting chamber 36. A first cover may be hingedly connected to the side wall 22 such that the first cover is perpendicular to the side wall 22 and substantially closes the incoming chamber 34. A second cover may be hingedly connected to the back wall 30, opposite to the side wall 22 to substantially close the outgoing chamber 36. When fully open, the second cover may enable full access to the exiting chamber 36 from both the front and side of the cabinet 10. The first cover and second cover may also include keyed locks and handles (not shown), located preferably on the outer edges of each cover, for providing security and accessibility, respectively, to the respective chambers 34, 36. In an alternative embodiment, each cover may be hingeless, completely removable, and releasably secured to the cabinet 10 with snaps, clips, or the like. Other arrangements are also possible.

The patch panel wall 32 may include a number of removable covers 120 that cover openings in the wall that provide access between the chambers 34, 36. The openings in the wall may include connector adapters for receiving connectors 122, 60.

The fiber optic connector adapter arrays may serve as termination points for incoming fiber optic pigtails 108, terminated by connectors 122, and exiting fiber optic cables 116, terminated by connectors 60. To help separate and guide the cables, guide plates 124, 126 may also be provided on the wall 32. The connector adapters may be configured for any type of fiber optic connectors 122, 60, such as, but not limited to, LC, FC, SC, ST, or MPO (or similar) types of fiber optic connectors. In addition, each of the adapters in an array may be configured to accept the same type of connectors, or, individual ones of the adapters in an array may be configured to individually accept different types of connectors.

Figure 2A:
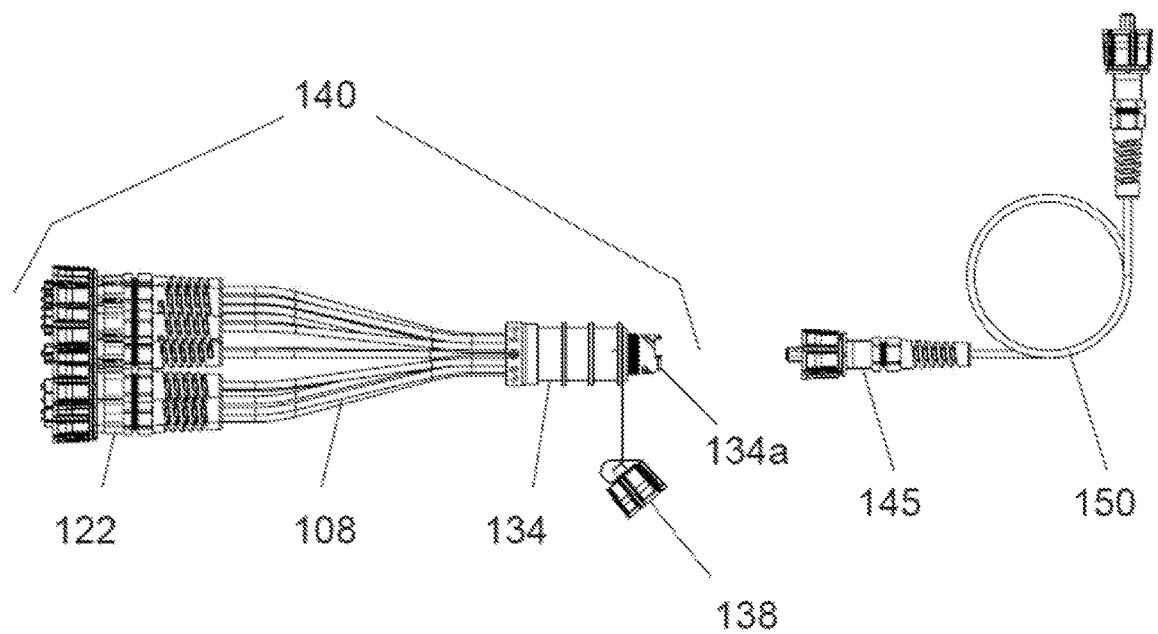
FIGS. 2A and 2B depict fan-out connector assemblies according to an embodiment.
Figure 2B:
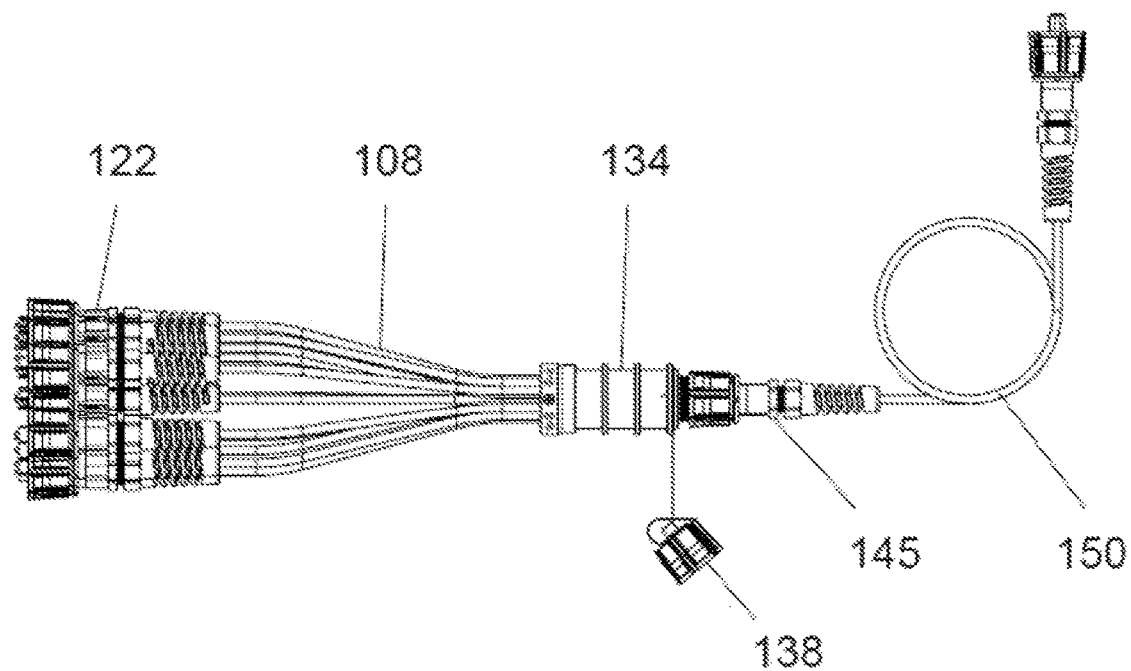

FIGS. 2A and 2B show isolated views of fan-out connector assemblies 140, including the fan-out connector 134 with attached cables 108 and connectors 122. For various housings 10 and end uses, such as in an FTTA system as described above, assemblies 140 may be provided with different lengths and types of cables 108, as well as different types of connectors 122. Assemblies 140 may be sold pre-assembled, or alternatively, the individual components (fan-out connector 134, cables 108 and connectors 122) may be provided separately for assembly by an end user.

A protective/dust cap 138 may be provided for covering and protecting the open end 134a of the fan out connector 134. Various configurations and features of the fan-out connector 134 are discussed further below. In an embodiment as depicted in FIGS. 2A and 2B, a feed cable 150 may be configured with an appropriate connector 145 for connection of the feed cable to the fan-out connector 134, and thereby connection of the fiber optic cables within the feed cable with fiber optic cables in the cables 108. With such an embodiment, a pre-assembled fan-out assembly 140 may be installed in a housing, such as housing 10, via a knock-out in the housing wall, as depicted in FIG. 1. In an embodiment, housings may be sold with one or more pre-installed fan-out assemblies.

After installation in a housing, and when needed for use, a feed cable 150 may simply be plugged into the fan-out connector 134 via be end 134a. The fan-out connector 134 therefore provides 'plug-and-play' ease of use. In a further embodiment, as also discussed below, a feed cable 150 could be an integral component of a fan-out connector assembly wherein the fiber optic cables within the feed cable are integral with the fiber optic cables of cables 108 so that no connector 145 is needed.

Figure 3A:
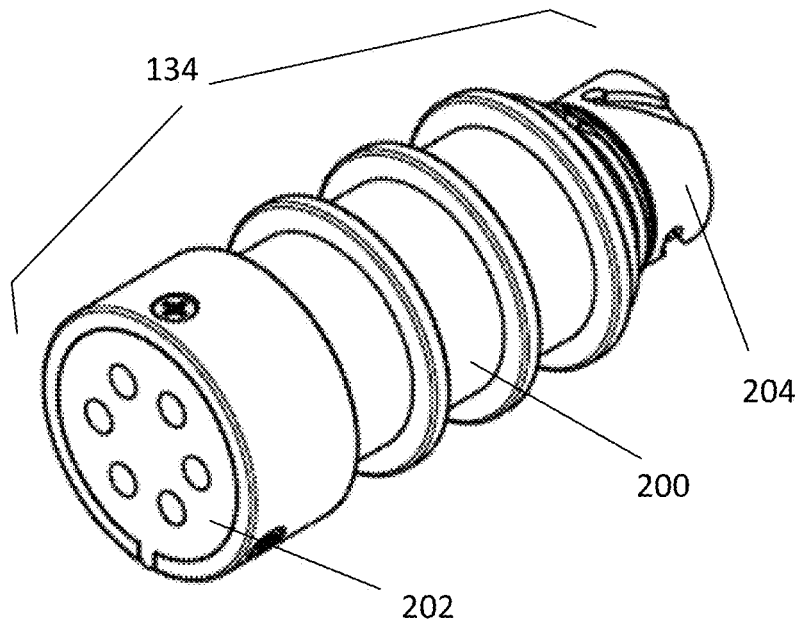
FIGS. 3A and 3B show a fan-out housing connector according to an embodiment.
Figure 3B:
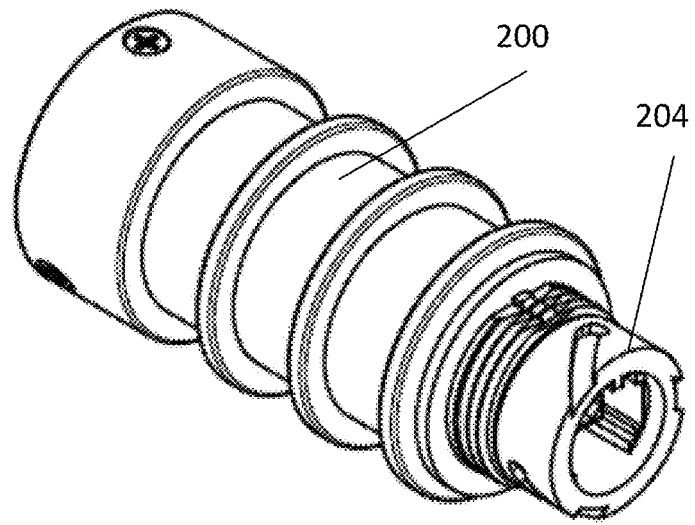
Figure 4A:
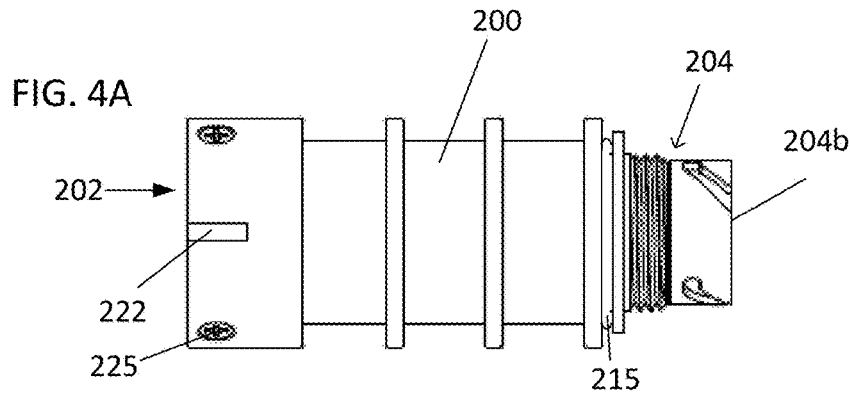
FIGS. 4A-4D depict alternate views of a fan-out connector according to embodiments.
Figure 4B:
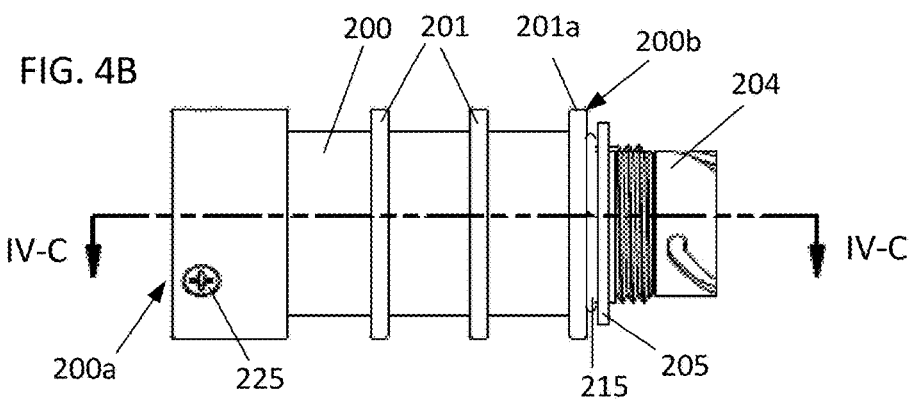
Figure 4C:
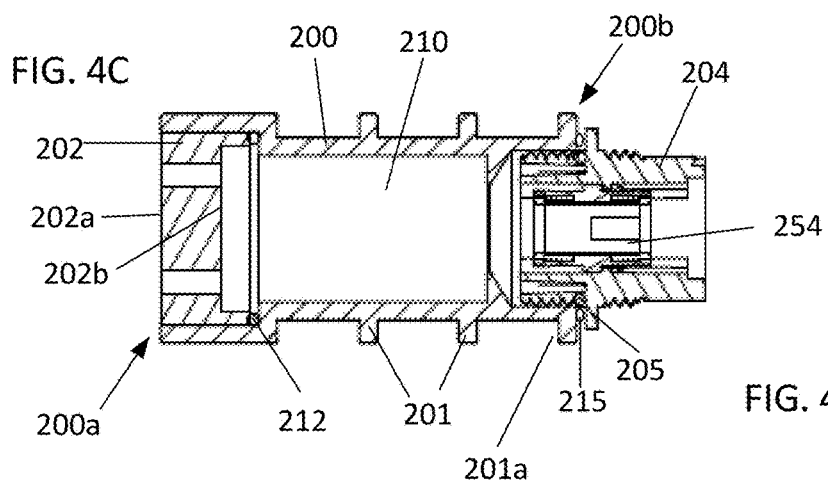
Figure 4D:
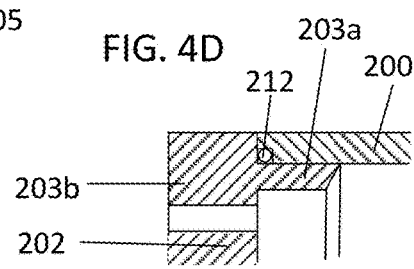
Figure 5:
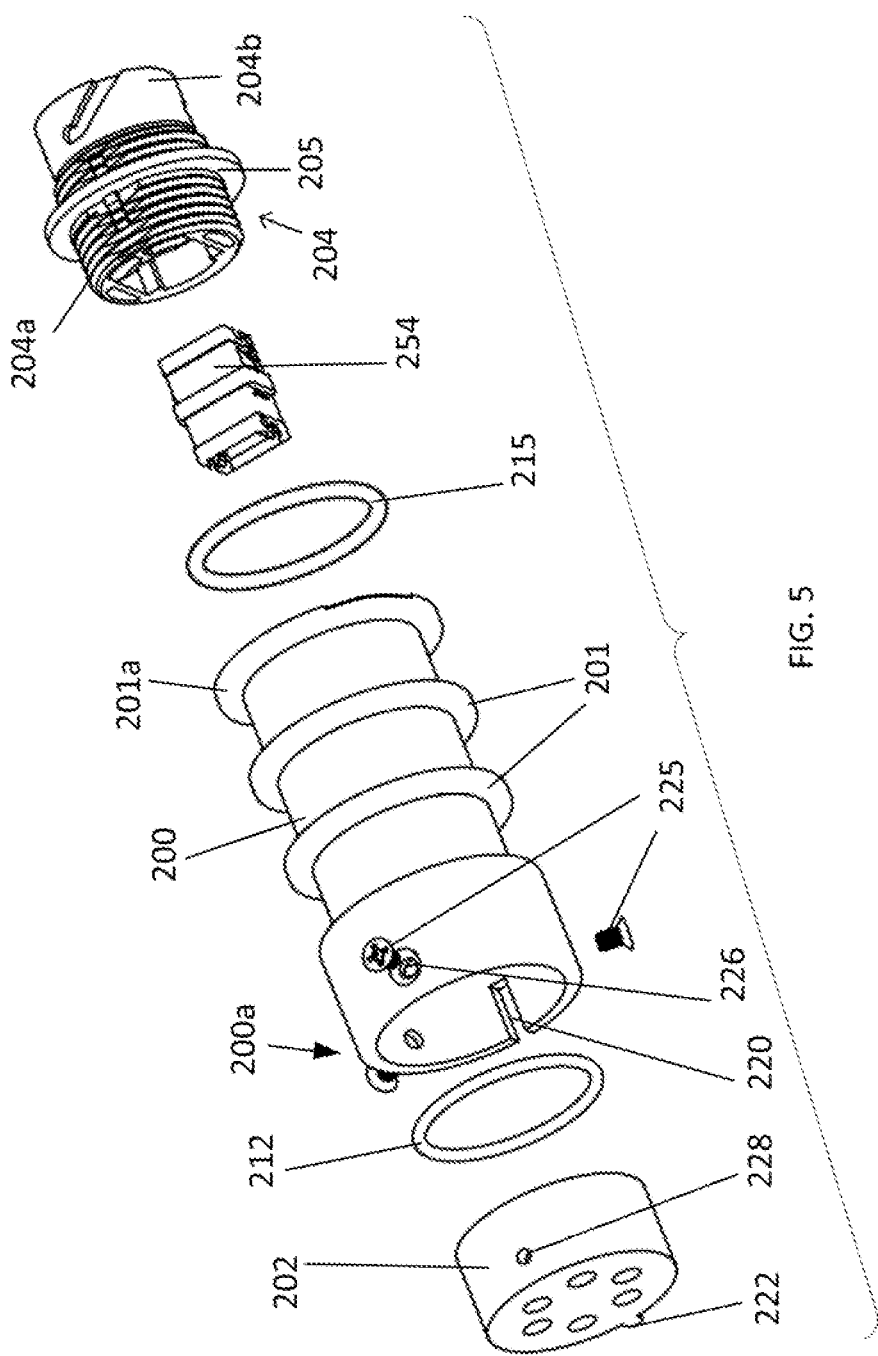
FIG. 5 provides an exploded view of a fan-out connector according to an embodiment.

The fan-out connector 134, may include a housing that, as shown in greater detail in FIGS. 3-5, for example, may include a main housing body 200, a fan-out member 202, and an optical fiber receptacle 204. In an embodiment, a fan-out housing for fanning out optical fibers of a multi-fiber source may include a main body 200 defining an interior cavity 210 therein and having a first body portion and a second body portion spaced from the first body portion. The fan-out housing may also include a fan-out member 202, discussed further below, releasably attachable with the first body portion for fanning out optical fibers 108, and a cable receptacle 204 releasably attachable with the second body portion. As discussed in more detail below, the cable receptacle 204 may be either of an optical fiber adapter configured for attachably receiving a connector of a multi-fiber optical cable, or an optical fiber cable gland configured for passage of a multi-fiber optical cable therethrough.

In an embodiment as shown in FIGS. 3-5, for example, the fan-out member may be a drum, and the receptacle may be an adapter. In an embodiment, housing body 200 may be essentially cylindrical and define a central longitudinal cavity 210. The housing 200 may be formed of any rigid material such as metal or polymers, and may be molded or machined. In an embodiment, the housing 200 may be machined aluminum, or may be injection molded and may be formed of a polymer, such as polybutylene terephthalate, polycarbonate, polystyrene, or polyethylene, to provide a few non-limiting examples.

In an embodiment, a housing 200 may include reinforcing bands 201 that may be disposed about the exterior of the housing. The bands 201 may provide a gripping feature that provide for a better grasp of the housing, for example, during installation or assembly. An end flange 201a may provide a seat against which the adapter 204 abuts as an insertion stop. An O-ring 215 may be provided between a flange 205 of the adapter 204 and the end flange 201a to provide a seal for keeping moisture out of the interior 210. The O-ring 215 may be silicone, or any other type of elastomeric polymer, such as butyl rubber, polyisoprene rubber, butadiene rubber, or nitrile rubber, to provide a few non-limiting examples. As an alternative to the O-ring 215, a that elastomeric washer may be provided between the flange 205 of the adapter 204 and the end flange 201a.

The fan-out member 202 may be disc-shaped, and may be configured as a cable guide drum. A first end 200a of the housing may be configured for receiving the cable guide drum 202 therein. In an embodiment as shown, the drum 202 may be configured to fit within the end 200a so that an exterior surface 202a is flush with the end 200a. In an alternative embodiment, as depicted in FIG. 4D, a portion 293a of the drum 202 may be configured to be disposed within the end 200a and a portion 203b may be configured to protrude axially from the end. The protruding portion 203b may have a larger diameter than the insertion portion 203a to provide an insertion stop, and the diameter of the protruding portion may match the diameter of the housing end. As shown in FIGS. 4C and 4D, an O-ring 212 may be disposed between the housing 200 and the drum 202 to provide a seal for keeping moisture from entering into the cavity 210. The O-ring 212 may be may be silicone, or any other type of elastomeric polymer, such as butyl rubber, polyisoprene rubber, butadiene rubber, or nitrile rubber, to provide a few non-limiting examples.

The end 200a of the housing 200 may include a key slot 220 and the drum 202 may include a key 222 configured to fit within the key slot, and prevent rotation of the drum within the housing. Alternatively, the drum 202, may include a slot and the housing 200 may include a key member that it's the slot. In an embodiment, the drum 202 may be retained within the end 200a by screws 225. In one embodiment, the housing end 202a may include holes 226 for receiving the screws 225 therethrough, and the drum 202 may include threaded holes 228 for receiving the screws. Holes 226 and 228 may be properly aligned, for the screws by means of the keying features 220, 222. In an alternative embodiment, holes 226 may be threaded, and the screws 225 may, if desired, be at least partially threaded into the housing 200 prior to placement of the drum 202 into the housing. Upon insertion of the drum 202 fully into the housing 200 the screws 225 may be tightened into place to retain the drum in the housing. If the holes 226 are threaded, the drum may or may not include the holes 228, wherein a tightening of the screws into the housing end may engage the ends of the screws with the drum 202 to frictionally retain the drum within the housing. Alternatively, as represented in FIG. 5A, to avoid alignment issues, and possibly eliminate the need for keying features, the drum 202 may include an annular groove 229 disposed about the drum 202 and the screws 225, by means of threaded holes 226, may be tightened into the annular groove in any relative position of the drum 202 within the housing 200. The screws 225 may frictionally engage the drum within the groove 229 to prevent rotation of the drum within the housing.

If a permanent attachment of the drum 202 to the housing 200 is desired, an adhesive may be used to retain the drum in the housing, and any keying alignment features and assembly holes may not be needed. In addition, other types of coupling may also be used, such as a snap together coupling wherein a projecting portion of at least one of the housing 200 and drum 202 may be configured to snap into and be retained within a groove or slot in the other of the housing, or drum. One additional type of coupling may include biased tabs which project radially inwardly from the end 200*a* and are configured to engage and retain the drum within the housing, wherein the tabs are movable radially outwardly to allow for passage of the drum into the housing end, and then return to an original configuration to retain the drum within the housing. Such tabs may be configured to be opened manually, or with a tool to allow for removal of the drum.

Figure 6A:
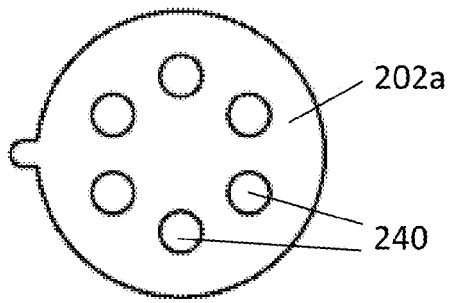
FIGS. 6A-6D provide alternative configurations for a drum component of a fan-out connector according to embodiments.
Figure 6B:
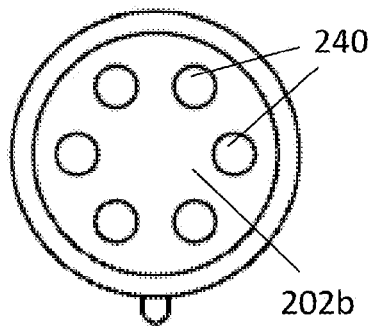
Figure 6:
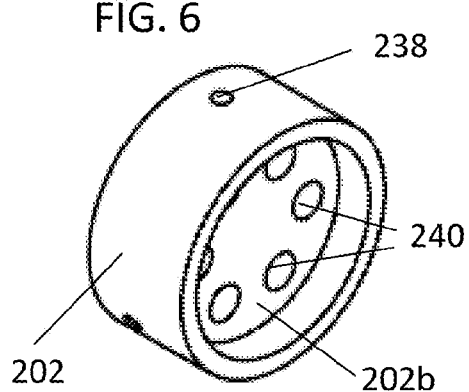
FIG. 6 provides a perspective view of a drum component of a fan-out connector according to an embodiment.
Figure 6C:
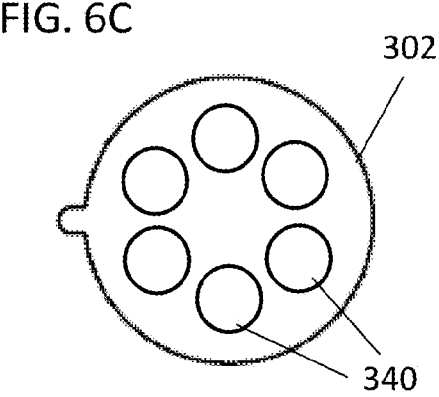
Figure 6D:
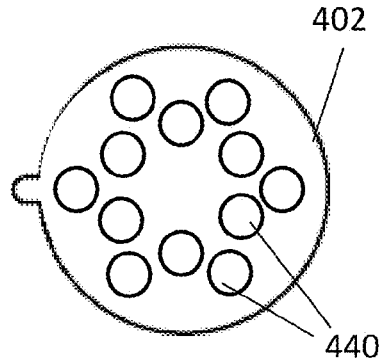

FIG. 6 provides a perspective view of a drum 202, such as represented in FIGS. 4C and 5. In an embodiment as shown, the surface 202*b* may be recessed from an insertion end to form a cavity (discussed further below). In an embodiment, a plurality of orifices 240 may be provided through the drum for receiving the cables 108. As represented in FIGS. 6C and 6D, a variety of different drums 302, 402 may be provided, and the different drums may provide alternative configurations with regard to the number and size of the orifices 340, 440. As represented by FIG. 6C, the size of the openings may be configured according to the size of the cable that is needed, or, as represented by FIG. 6D, for applications where a greater number of cables are needed, the number of the openings 440 may be configured accordingly. FIG. 6D represents a drum such as may be used in the configuration as depicted in FIGS. 2A and 2B wherein twelve cables 108 fan-out from the housing.

As represented in FIGS. 4C and 5, a second end 200*b* of the housing 200 may be configured for receiving an adapter 204, or alternatively, a pass-through cable gland 250 therein. Various configurations/sizes of adapters 204 and/or cable glands 250 may be provided for installation at the second end 200*b* of the housing 200. In an embodiment as shown, the second end 200*b* may be internally threaded for threaded receipt of an adapter 204 or cable gland 250 therein. The adapter 204 or cable gland 250 may have an externally threaded end 204*a*, 250*a* that is correspondingly threaded for being rotatably threaded into the housing 200. Alternatively, other types of engagement couplings may be used for retaining an adapter 204 or gland 250 on the housing 200, such as those described above for retaining the drum within the end 200*a*.

An adapter 204 or cable gland 250 may include a radially extending flange 205, 251, respectively, that may act as a stop for limiting insertion of the adapter or gland into the housing, while also providing a seat for engaging with the O-ring 215 and compressing the O-ring against the flange 201*a* of the housing 200. In a further embodiment, instead of sealing with an O-ring, such as O-ring 215, a joint thread compound or Teflon tape may be provided on the threads to provide a weather-tight seal between the adapter 204 or gland 250 and the housing 200.

Figure 10:
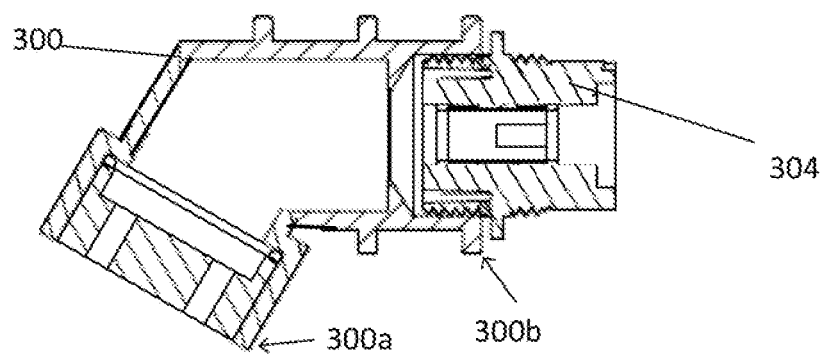
FIG. 10 provides a cross-sectional view of an angled fan-out connector according to an embodiment.

An adapter body 204 may be configured to receive different types of cable mating adapters 254 therein. The mating adapters may have a plug-in socket at each end thereof configured for any type of multi-fiber connectors to mate the terminal ends of the connectors. As an example, adapters 254 may be configured to mate incoming connectors of types MPO (or similar), with another connector of type MPO (or similar). In a variant embodiment, the adapter may be one-piece adapters 304 as depicted in FIG. 10, and may include an integral internal cable mating configuration of any of the types as described above. For an integral adapter 304, instead of inserting a mating connector 254 within the adapter 204, the user would only need to select and install an appropriately configured adapter.

As represented in FIG. 5D, an end 204*b* may have an elongated threaded portion 204*c* adjacent the flange 205. End 204*b* may be inserted through a knock-out opening 29 of a panel wall 28 (as represented in FIG. 1) to the position in which the flange 205 rests against the panel wall, so that the threaded portion 204*c* extends through the wall. A lock-nut 27 may be inserted onto the end 204*b* and threaded onto the threaded portion 204*c* to fasten the adapter 204 (and attached housing 200) to the panel. The protruding end 204*b* may be configured as a bayonet coupling for connection to a bayonet connector, such as bayonet connector 145 in FIGS. 2A, 2B. Additional coupling configurations may also be provided on the end 204*a*.

For cable glands, such as the depicted gland 250 in FIGS. 5B and 5C, the end 250*b* may be partially threaded for receiving the pressure dome 252. A sealing sleeve 253 may be provided within the dome 252 for being disposed about a through cable so that upon threading the pressure dome onto the end 250*b*, the sealing sleeve may be compressed about the cable to provide a weather-proof seal about the cable while also providing a retention force for holding the cable with the gland. Various sizes and styles of cable glands may be threaded to the housing 200 dependent on the cable being used. For example sealing sleeves 253 may have a round opening for round cables, or a rectangular opening for flat cables.

In an embodiment, instead of a cylindrical housing, such as housing 200 with ends 200*a* and 200*b* disposed essentially along a linear axis, or at 180° from one another, a housing 300, as shown in FIG. 10, may be bent, or angled to adapt the housing for a particular use. In the embodiment represented in FIG. 10, end 300*a* is disposed at an angle of about 120° from the end 300*b*. In various embodiments, the angular disposition between the ends may be from 90° to about 180°. As examples, end 300*a* may be disposed with respect to the end 300*b* at angles of about 180°, about 175°, about 170°, about 165°, about 160°, about 155°, about 150°, about 145°, about 140°, about 135°, about 130°, about 125°, about 120°, about 115°, about 110°, about 95°, about 90°, less than about 90°, or any angle between any of the listed values.

While the housing 200 represented in FIG. 5 has a circular cross-section, in various other embodiments (not shown), a housing may have a cross-section that may be rectangular, triangular, hexagonal, or various other configurations.

Figure 7A:
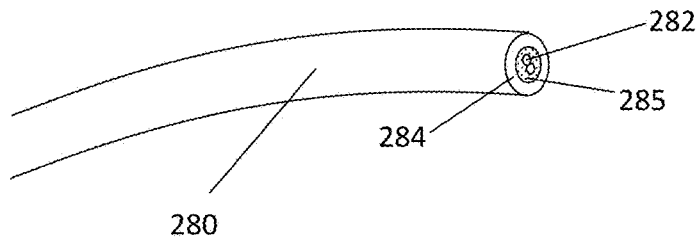
FIGS. 7A-7E illustrate representative steps for assembly of furcation tubings with a drum component according to an embodiment.
Figure 7B:
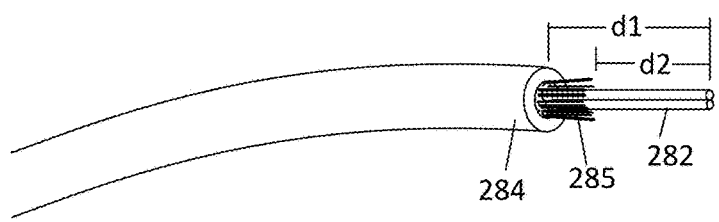

A fan out assembly 140 having six duplex fiber optic cables 108, similar to the representation in FIG. 4A with twelve cables, may be assembled as follows. An unstripped furcation tube 280 having duplex furcation tubes 282 is represented in FIG. 7A. In an embodiment, for example, the furcation tubes 282 may have an inner diameter of about 900 μm. The furcation tubing 280 may be cut to an appropriate length, as needed, and a portion d1 of a cable jacket 284 may be removed to expose the reinforcement members 285. The reinforcement members 285 may be Kevlar strands. A portion d2 of the reinforcement members 285 may be cut away to expose the furcation tubes 282 as represented in FIG. 7B. In an embodiment, for example, the distance d1 may be about 20 mm and the distance d2 may be about 15 mm, leaving about 5 mm of reinforcement strands 285 exposed, and furcation tubes 282 extending about 15 mm beyond the reinforcement strands. If desired, about 1 mm of the furcation tubes may be trimmed to make the tubes even.

Figure 7C:
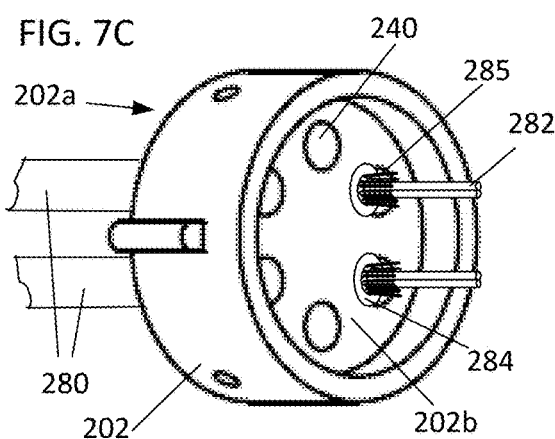

After preparing the furcation tubes as discussed above, the tubing 280 may be installed in a drum 202. The stripped portion of the tubing 280 may be inserted into and through an orifice 240 of the drum 202 from the side 202a until the end of the cable jacket 284 is approximately even with the inside surface 202b of the drum as represented in FIG. 7C. Six cable sections 280 may be installed in this manner.

Figure 7D:
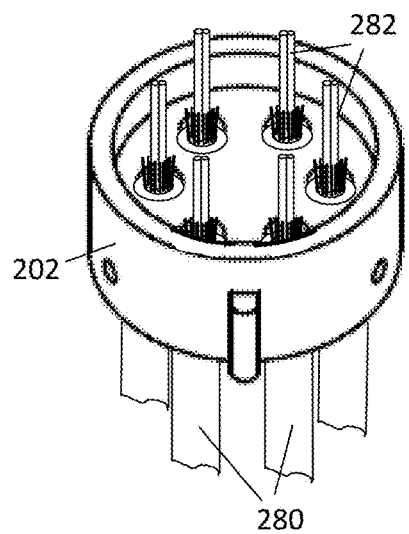
Figure 7E:
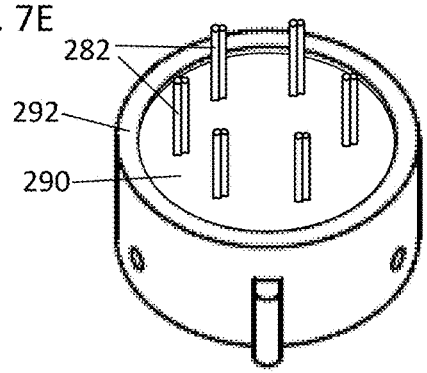
Figure 8:
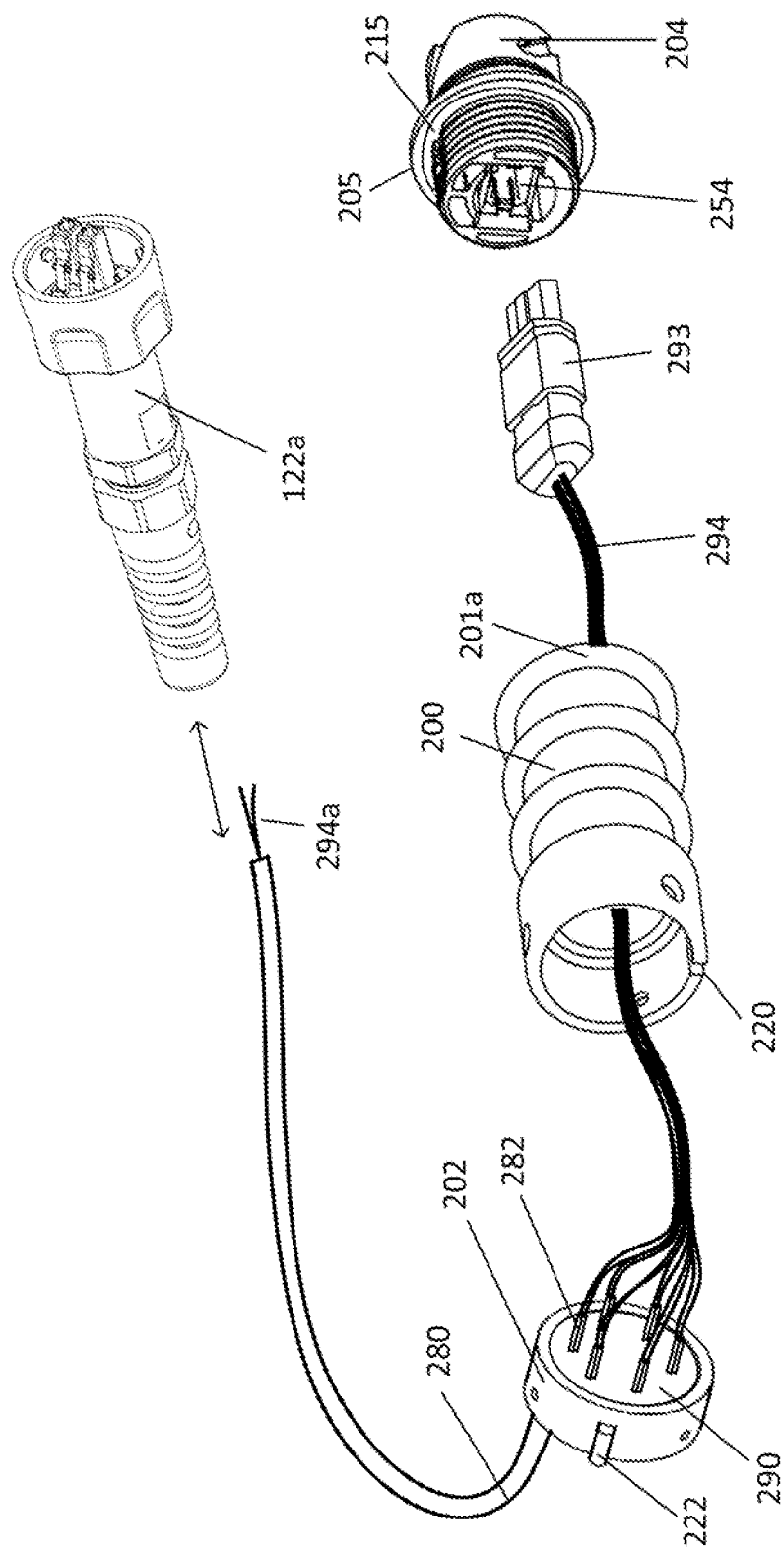
FIG. 8 illustrates assembly steps of a fan-out connector according to an embodiment.
Figure 9:
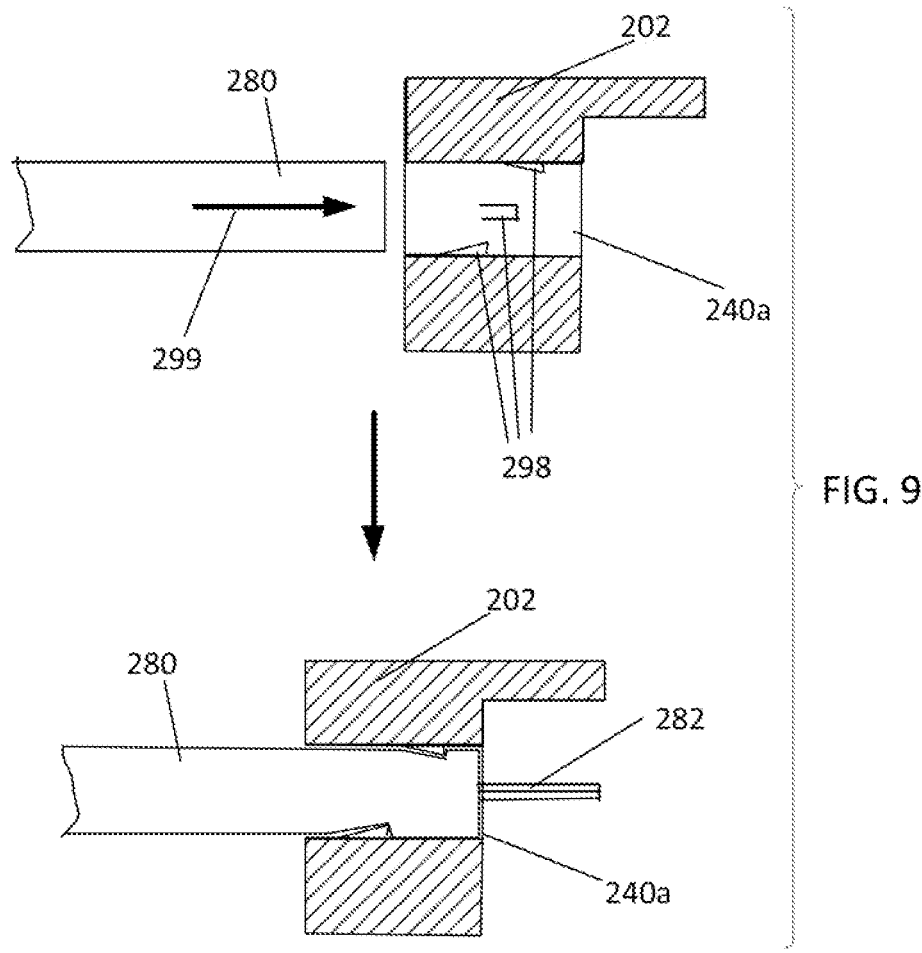
FIG. 9 provides an alternative furcation tube connection according to an embodiment.

The tubing sections 280 may be fastened with the drum 202 by means of an adhesive. In one embodiment, as represented in FIGS. 7D and 7E, the drum 202 may be mounted vertically with the tubing sections 280 extending below, and the recessed cup of the drum facing upwardly. A liquid adhesive, or potting compound 290 may then be injected around the furcation tubes 282 to a level approximately even with the top edge 292 of the drum 202. The adhesive may then be allowed to cure to affix the cable sections 280 with the drum 201. For simplification of the drawings, the extending cable sections 280 are omitted from FIG. 7E, and similarly, only one is shown in FIG. 8. For some embodiment, the adhesive/potting compound 290 may be injected with a syringe. The adhesive may be a two part formula that is mixed upon injection, and may be self-leveling to essentially provide an even surface around the extending tubings 282. A cure time of about 2 hours may be sufficient for curing of some potting compounds, while the cure time of various adhesive-type materials will vary.

In an alternative configuration, that may provide an assembly without the need for adhesive/potting compound, a drum 202 may have orifices 240a that include projecting teeth 298 projecting internally into the orifice. The teeth may be configured to allow the tubing sections 280 to be inserted into the orifices 240a along the direction of the arrow 299, but prevent, or at least inhibit movement back out of the orifices in the opposite direction by biting into the jacket of the tubing 280. The configuration, placement and number of teeth 298 may be varied as may be required for different situations. A sealant may be applied at the orifices 240a and/or the tubing 280 being inserted to weatherproof the connection.

As represented in FIG. 5, the O-ring 215 may be installed onto the adapter 204 (or alternatively, a cable gland 250, FIG. 5B). The additional O-ring 212 may be installed into the end 200a of the housing 200, to a position as shown essentially in FIG. 4C. For an embodiment wherein the adapter 204 may include an IP-MPO mating adapter 254 therein, a fan-out connector, such as a terminated MPO connector 293, as represented in FIG. 8, may be plugged into the mating adapter 254. The terminated MPO connector 293 may include a plurality of individual fibers 294 extending therefrom. In an embodiment, the fibers may be 250 μm fibers, and for six duplex cables, there may be twelve fibers extending from the connector 293. The fibers 294 may be fed through the housing 200 from the end 200b of the housing. Alternatively, in one embodiment, the interior passage 210 of the housing may be sized for passage of a connector, such as connector 293, therethrough. Housing 200 may then be fastened with the adapter 204, such as by threading the housing onto the adapter, and the O-ring 215 may be compressed between the adapter flange 205 and the flange 201a of the housing 200.

Individual ones of the fibers 294 may be fed into the potted ends of the furcation tubes 282 of the drum 202 until ends 294 extend from the tubes 280. For simplification, only one of the tubings 280 is shown. After feeding fibers 294 into the furcation tubes 282 (two each per tube 280), the drum 202 and attached tubings 280, may be moved towards the housing (allowing the fibers 294 to move further into the tubes 282) until the drum mates with the housing, aligning the key 222 with the slot 220. After the drum 202 seats against the O-ring 212, screw holes 226 and 228 may not be fully aligned. A further inward pressure of the drum 202 into the housing 200 may be needed to compress the O-ring and align the screw holes 226 and 228. Screws 225 may then be inserted to retain the drum 202 in the housing 200 with the O-ring 212 sealing therebetween.

Duplex fiber optic connectors 122a may then be installed onto the ends of the tubing sections 280 and the ends 294a of the fibers 294. A resulting fan-out connector assembly may be provided, essentially similar to assembly 140 of FIG. 2A, except having 6 duplex connectors 122a instead of twelve simplex connectors 122. A finished assembly 140 may be fastened in an antenna structure as represented in FIG. 1A, by clamping the housing 200 to a portion of the framework of the antenna. Alternatively, an assembly 140 may be installed via a knock-out into a housing, such as housing 10 in FIG. 1B, by inserting the end 134a of the of the connector through the hole provided by removing a knock-out. A threaded ring nut may be threaded onto the end 134a to hold the connector 134 in place within the housing 10. Dust/protective caps 138 may be installed to protect the connection until ready to use.

In an embodiment, the fan out assembly may be used in a method for connecting remote radio units of a cellular antenna tower with a base transceiver station via a multi-fiber optical cable. The multi-fiber optical cable may include a terminal connector, and the method includes attaching the fiber optic fan-out connector assembly 140 in a tower 1 adjacent the remote radio units. This distance may, for example be about 3 meters, 3.5 meters, 4 meters, 4.5 meters, 5 meters. In some embodiments, the distance may be more or less depending on the structure of the antenna. The fan-out connector assembly for the antenna tower may include a housing defining an interior cavity, a plurality of pigtail cable segments extending from the housing, with each of the plurality of pigtail cable segments having a first end disposed within the housing and a free end disposed away from the first end, at least one optical fiber extending through each pigtail cable segment and having a first end within the interior cavity and a second end at the free end of the pigtail cable segment, and optical fiber connectors mounted to the free ends of each pigtail cable segment and terminating the second end of the at least one optical fiber of the pigtail cable segment. The housing may also include a mating connector for connecting first ends of the optical fibers with the connector of the multi-fiber optical cable, and the mating connector may include a plug-in socket for receiving the connector of the multi-fiber optical cable therein. Once the assembly is fastened in place, the procedure for connecting may include connecting the second optical fiber connectors of the pigtail cable segments to the remote radio units, and connecting the multi-fiber optical cable from the fan-out connector assembly to the base transceiver station, the connecting comprising plugging the connector of the multi-fiber optical cable into the plug-in socket of the mating connector.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A fan-out housing for fanning out optical fibers of a multi-fiber source, the housing comprising:
   a main body defining an interior cavity therein and having a first body portion and a second body portion spaced from the first body portion;
   a fan-out member releasably attachable with the first body portion for fanning out optical fibers, the fan-out member comprising:
      a disc-shaped member having a first side for being disposed towards the interior cavity, a second side opposite the first side, and at least one of a key slot and a key configured to prevent rotation; and
   a plurality of spaced apart openings extending through the fan-out member from the first side to the second side, with each opening being configured for receiving at least one optical fiber therethrough in a spaced apart relationship with optical fibers in others of the openings; and
   a cable receptacle releasably attachable with the second body portion, the cable receptacle comprising one of:
      an optical fiber adapter configured for attachably receiving a connector of a multi-fiber optical cable; or
      an optical fiber cable gland configured for passage of a multi-fiber optical cable therethrough.

2. The fan-out housing of claim 1, wherein the main body comprises a tubular member having a first end and a second end, the first end comprising the first body portion and the second end comprising the second body portion.

3. The fan-out housing of claim 2, wherein:
   the first end of the tubular member defines a first opening into the internal cavity;
   at least a portion of the fan-out member fits internally within the first opening; and
   at least one of the first end of the tubular member and the at least a portion of the fan-out member comprises a releasable attachment for engaging with the other of the first end of the tubular member and the at least a portion of the fan out member to releasably attach the fan-out member with the main body.

4. The fan-out housing of claim 2, wherein:
   the second end of the tubular member defines a second opening into the internal cavity;
   at least a portion of the cable receptacle fits internally within the second opening; and
   at least one of the second end of the tubular member and the at least a portion of the cable receptacle comprises a releasable attachment for engaging with the other of the second end of the tubular member and the at least a portion of the receptacle to releasably attach the cable receptacle with the main body.

5. The fan-out housing of claim 4, wherein the cable receptacle comprises the cable gland.

6. The fan-out housing of claim 4, wherein the cable receptacle comprises the optical fiber adapter.

7. The fan-out housing of claim 6, wherein the optical fiber adapter comprises:
   an interior passage through the optical fiber adapter;
   a fiber optic cable mating adapter for being disposed within the interior passage, the cable mating adapter being configured for receiving and mating fiber optic cables of the multi-fiber optical cable with additional individual fiber optic cables.

8. The fan-out housing of claim 7, wherein the cable mating adapter has a first end for being disposed towards the interior cavity of the main body, and a second end in axial alignment with the first end, with the second end configured for receiving the connector of a multi-fiber optical cable, and the first end configured for receiving a fan-out connector collectively terminating ends of the additional individual optic fibers.

9. The fan-out housing of claim 2, wherein:
   the main body comprises a cylindrical tubular member having a first axial end and a second axial end, the first axial end comprising the first body portion and the second axial end comprising the second body portion;
   the fan-out member comprises a cylindrical drum for being disposed within the first axial end of the main body, the cylindrical drum having a first side for being disposed towards the interior cavity and a second side opposite the first side, and the cylindrical drum comprising a plurality of spaced apart openings extending through the cylindrical drum from the first side to the second side, with each opening configured for receiving at least one optical fiber therethrough in a spaced apart relationship with optical fibers in others of the openings;
   the cable receptacle comprises the optical fiber adapter, and the optical fiber adapter comprises:
      a cylindrical body defining an interior passage therethrough, the cylindrical body having a first end for being inserted into the second axial end of the main body, and a second end for protruding axially away from second axial end;
      a fiber optic cable mating adapter for being disposed within the interior passage, the cable mating adapter being configured for receiving and mating fiber optic cables of the multi-fiber optical cable with additional individual optical fibers, and the cable mating adapter has a first end for being disposed towards the interior cavity of the main body, and a second end in axial alignment with the first end, with the second end configured for receiving the connector of a multi-fiber optical cable, and the first end configured for receiving a fan-out connector collectively terminating ends of the additional individual optic fibers.

10. A fan-out assembly for connecting fiber optic cables of a multi-fiber optical cable to a plurality of fiber optic terminals, the assembly comprising:
   a housing defining an interior cavity therein;
   a plurality of pigtail cable segments having a first end disposed within the housing and a free end disposed away from the housing;
   at least one optical fiber extending through each pigtail cable segment, each optical fiber comprising a first end disposed within the interior cavity and a second end disposed at the free end of the pigtail cable segment;
   a first optical fiber connector collectively terminating the first ends of a plurality of the optical fibers;
   at least one second optical fiber connector mounted to the free end of each pigtail cable segment and terminating the second end of the at least one optical fiber of the pigtail cable segment, the second optical fiber connectors being configured to mate with the fiber optic terminals; and
   the housing comprising an optical fiber adapter having a first end open to the interior cavity for receiving the first optical fiber connector therein, and a second end exposed externally of the interior cavity for receiving a connector of a multi-fiber optical cable to mate the optical fibers of the multi-fiber optical cable with the first ends of the optical fibers of the pigtail cable segments and a fan-out member comprising a disc-shaped member having a plurality of openings and at least one of a key slot and a key configured to prevent rotation.

11. The assembly of claim 10, wherein the housing further comprises:
a main body defining the interior cavity therein, the main body having a first body portion and a second body portion spaced from the first body portion; and
the fan-out member releasably attachable to the first body portion and comprising the plurality of spaced apart openings extending through the fan-out member, with at least one pigtail cable segment disposed in each of the plurality of spaced apart openings; and
the optical fiber adapter is releasably attachable to the second body portion.

12. The assembly of claim 11, wherein:
the main body comprises a tubular member having a first axial end and a second axial end, the first axial end comprising the first body portion and the second axial end comprising the second body portion;
at least a portion of the fan-out member fits internally within the first axial end, and at least one of the first axial end of the tubular member and the at least a portion of the fan-out member comprises a first releasable attachment for engaging with the other of the first axial end of the tubular member and the at least a portion of the fan out member to releasably attach the fan-out member with the main body; and
at least a portion of the cable receptacle fits internally within the second axial end, and at least one of the second axial end of the tubular member and the at least a portion of the cable receptacle comprises a second releasable attachment for engaging with the other of the second end of the tubular member and the at least a portion of the receptacle to releasably attach the cable receptacle with the main body.

13. The assembly of claim 12, wherein:
the first axial end defines a first cylindrical opening; and
the fan-out member comprises the disc-shaped member for being disposed within the cylindrical opening, the disc-shaped member having a first side for being disposed towards the interior cavity and a second side opposite the first side, with the plurality of spaced apart openings extending through the fan-out member from the first side to the second side.

14. The assembly of claim 13, wherein:
the second axial end defines a second cylindrical opening; and
the first end of the optical fiber adapter comprises a first cylindrical end for being disposed within the second cylindrical opening, and the second end of the optical fiber adapter comprises a second cylindrical end spaced axially away from the first cylindrical end;
the optical fiber adapter comprises:
an interior passage through the optical fiber adapter from the first cylindrical end to the second cylindrical end; and
a fiber optic cable mating adapter disposed within the interior passage, the cable mating adapter having a first end disposed towards the internal cavity and comprising a first plug-in socket for receiving the first optical fiber connector therein, and a second end disposed away from the interior cavity for receiving the connector of a multi-fiber optical cable to align and mate the optical fibers of a multi-fiber optical cable with the first ends of the optical fibers of the pigtail cable segments.

15. The assembly of claim 14, wherein:
the first axial end comprises a stop for limiting insertion of the disc-shaped member into the first axial end, the stop comprising a radial shoulder; and
the assembly comprises an elastomeric sealing member for being disposed between the shoulder and the disc-shaped member to seal the disc-shaped member with the main body.

16. The assembly of claim 14, wherein:
the optical fiber adapter comprises a radially extending flange for seating against the second axial end of the main body; and
the assembly further comprises an elastomeric sealing member for being disposed between the flange and the second end to seal the optical fiber adapter with the main body.

17. The assembly of claim 14, wherein:
the first releasable attachment comprises screws disposed radially through the first axial end of the main body and corresponding threaded holes in a radially external surface of the disc-shaped member for receiving the screws therein; and
the second releasable attachment comprises internal threads disposed radially within the second axial end of the main body and corresponding external threads on the first end of the optical fiber adapter for a threaded engagement between the optical fiber adapter and the second axial end of the main body.

* * * * *